(No Model.)  
7 Sheets—Sheet 1.

F. W. HOFELE.
TELESCOPIC LADDER.

No. 360,806.  
Patented Apr. 5, 1887.

WITNESSES:  
A. Schehl.  
Carl Karr

INVENTOR  
Ferdinand W. Hofele  
BY  
ATTORNEYS.

(No Model.) 7 Sheets—Sheet 2.

F. W. HOFELE.
TELESCOPIC LADDER.

No. 360,806. Patented Apr. 5, 1887.

WITNESSES: A. Schehl. Carl Karp.

INVENTOR Ferdinand W. Hofele
BY Goepel & Raegener
ATTORNEYS.

(No Model.) 7 Sheets—Sheet 3.
F. W. HOFELE.
TELESCOPIC LADDER.
No. 360,806. Patented Apr. 5, 1887.
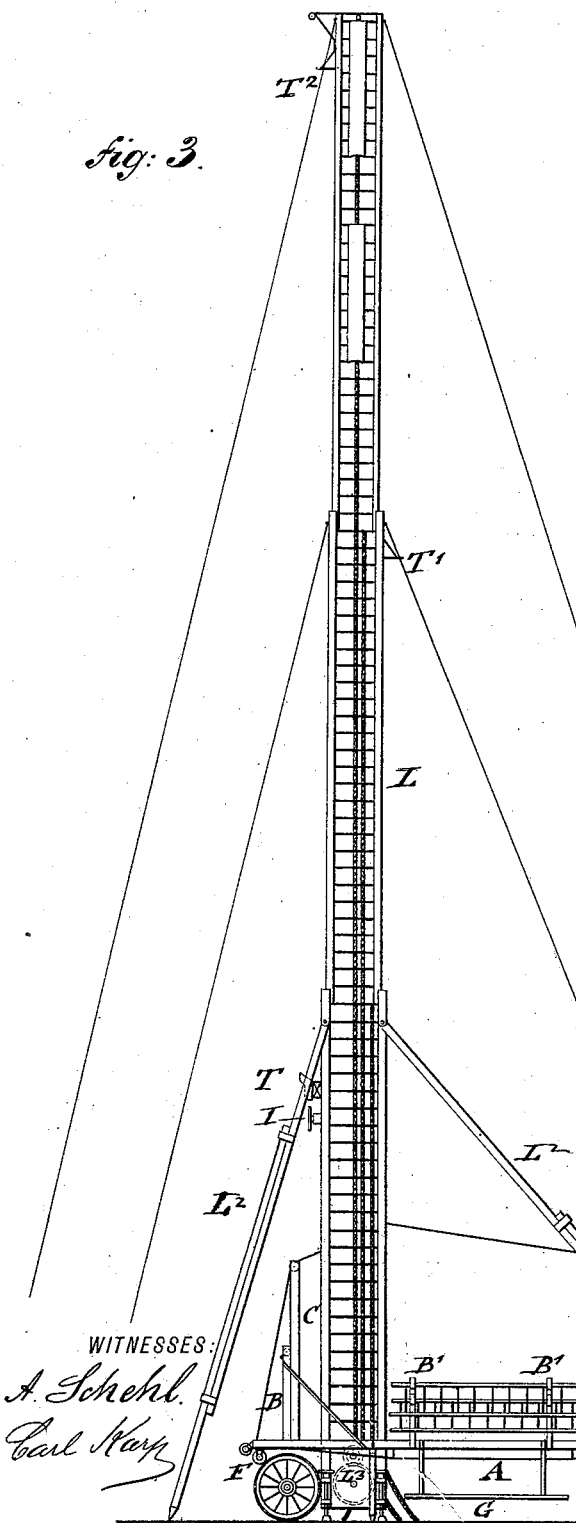
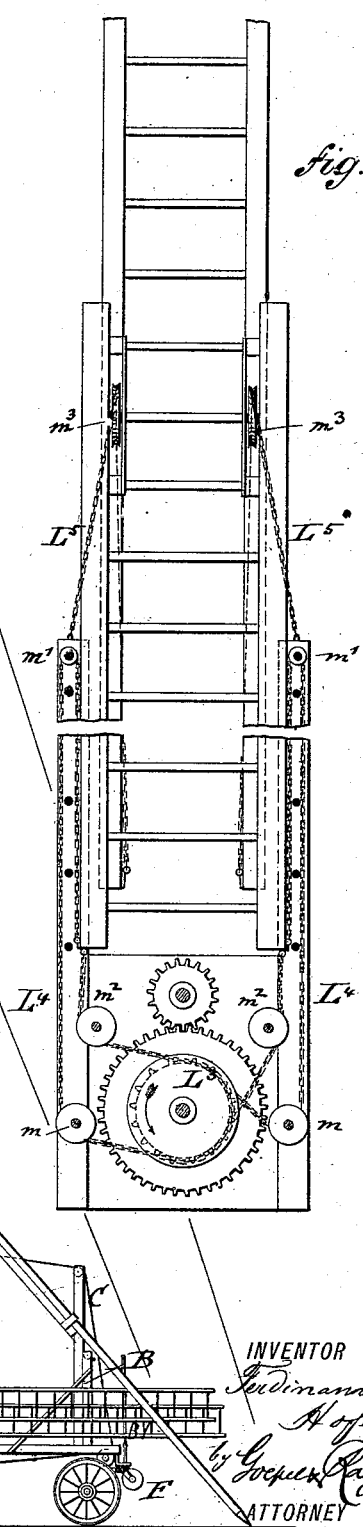
Fig. 3.
Fig. 4.
WITNESSES:
A. Schehl.
Carl Karp
INVENTOR
Ferdinand W. Hofele
by Goepel & Raegener
ATTORNEY (No Model.)  7 Sheets—Sheet 4.
F. W. HOFELE.
TELESCOPIC LADDER.
No. 360,806.  Patented Apr. 5, 1887.
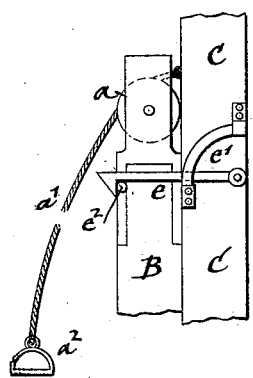
Fig. 6.
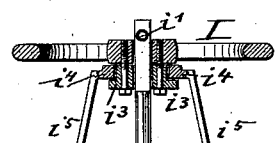
Fig. 5.
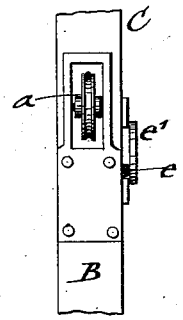
Fig. 7.
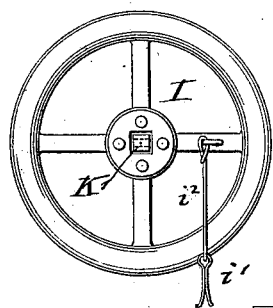
Fig. 5ª.
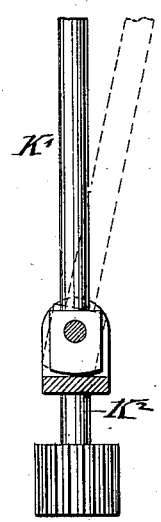
Fig. 5ᵇ.
WITNESSES:
A. Schehl.
Carl Karz
INVENTOR
Ferdinand W. Hofele
BY
Goepel & Raegener
ATTORNEYS.

(No Model.) 7 Sheets—Sheet 5.
F. W. HOFELE.
TELESCOPIC LADDER.
No. 360,806. Patented Apr. 5, 1887.
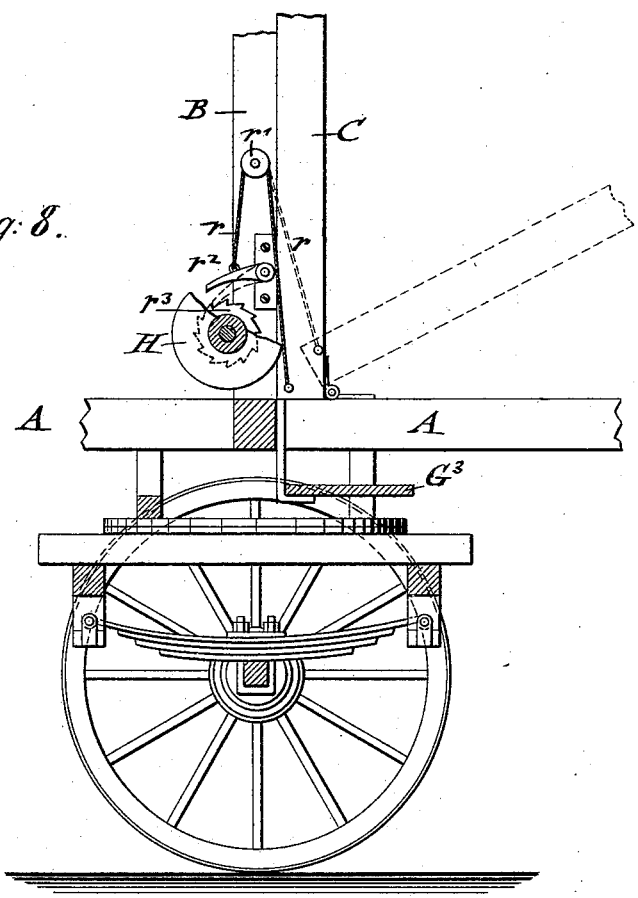
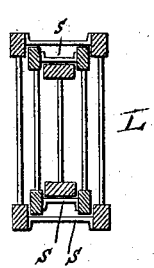
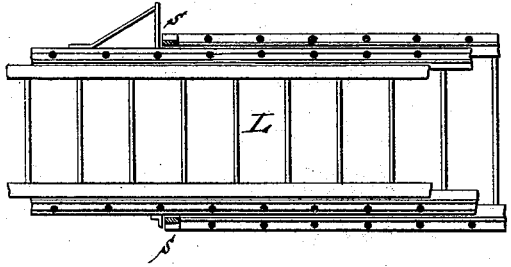
WITNESSES:
A. Schehl.
Carl Karp
INVENTOR
Ferdinand W. Hofele
BY Goepel & Raegener
ATTORNEYS.

(No Model.) 7 Sheets—Sheet 6.
F. W. HOFELE.
TELESCOPIC LADDER.
No. 360,806. Patented Apr. 5, 1887.
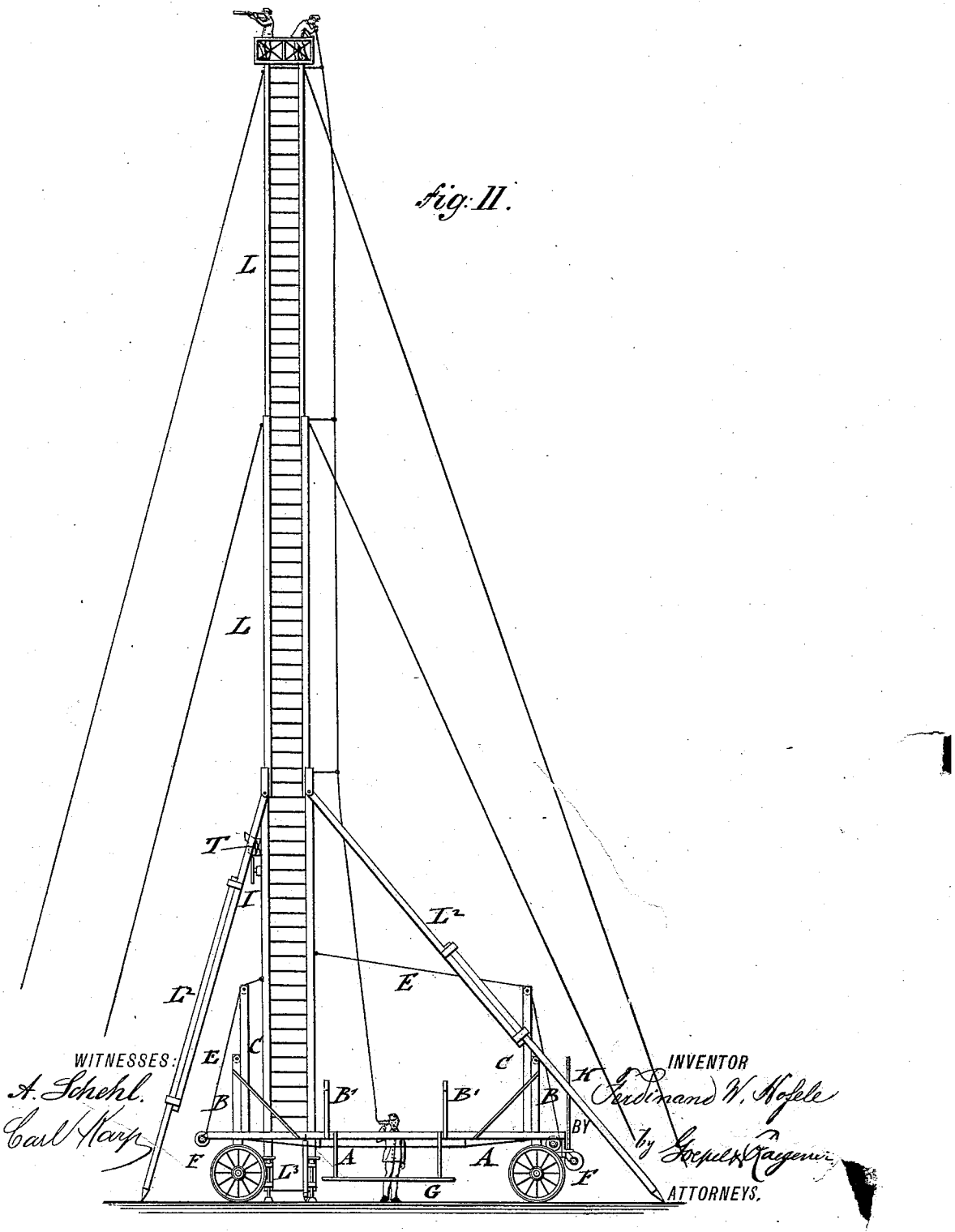

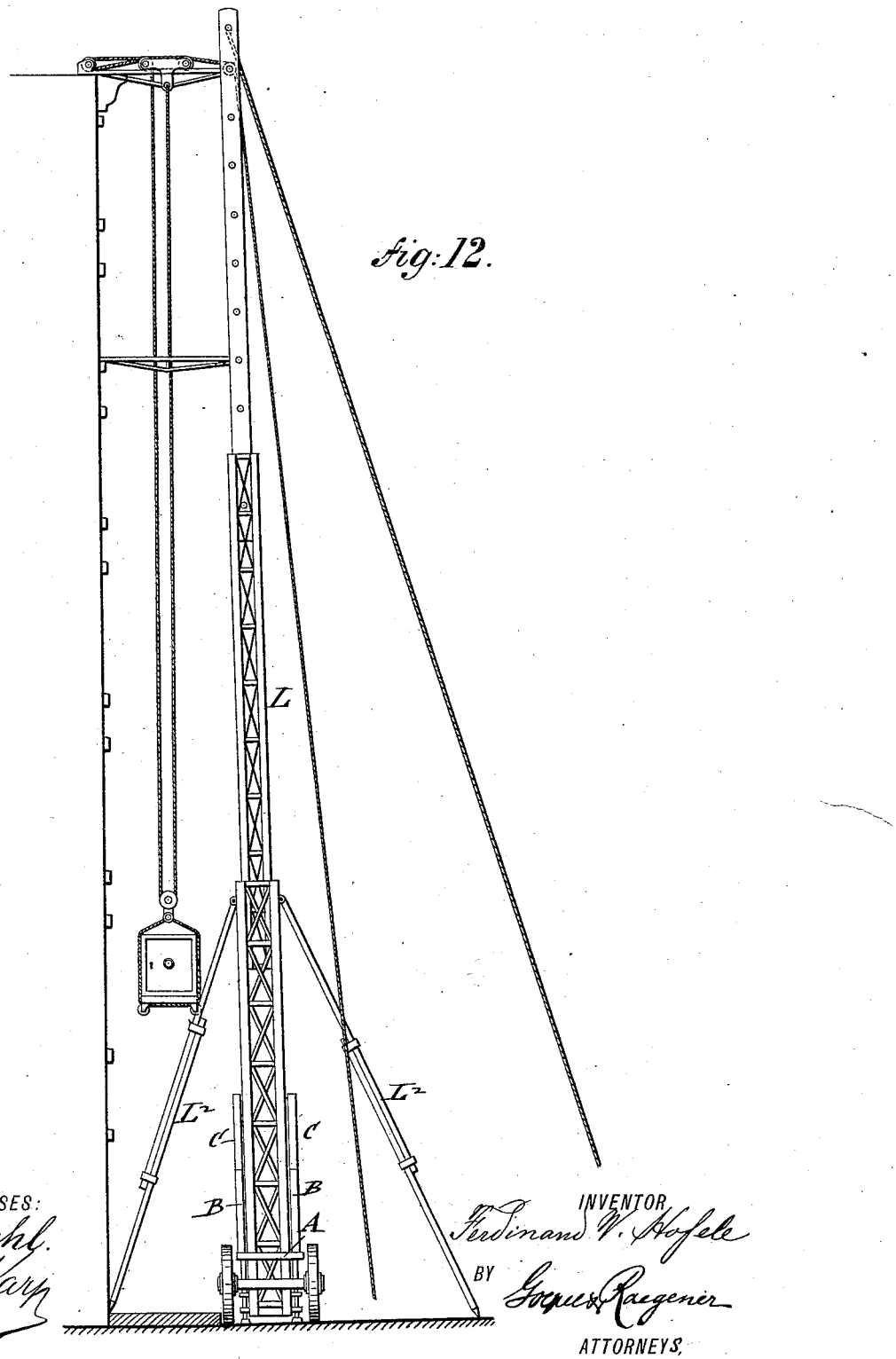

UNITED STATES PATENT OFFICE.

FERDINAND W. HOFELE, OF NEW YORK, N. Y., ASSIGNOR TO EBEN S. ALLEN, OF SAME PLACE.

TELESCOPIC LADDER.

SPECIFICATION forming part of Letters Patent No. 360,806, dated April 5, 1887.

Application filed July 24, 1886. Serial No. 208,911. (No model.) Patented in England September 13, 1886, No. 11,021, and in France December 13, 1886, No. 177,856.

*To all whom it may concern:*

Be it known that I, FERDINAND W. HOFELE, of the city, county, and State of New York, have invented certain new and useful Improvements in Telescopic Ladders, of which the following is a specification.

This invention relates to certain improvements in the telescopic ladder for which Letters Patent of the United States have been granted to me heretofore, No. 232,968, dated October 5, 1880, said improvements relating to certain details of construction by which said ladder can be handled in a more reliable and effective manner when being extended or telescoped, so that the same can be used with greater advantage by fire departments, for portable army observatories, for hoisting safes, and for other purposes; and the invention consists of certain details of construction and combinations of parts, which will be fully described hereinafter, and finally be pointed out in the claims.

Figure 1:
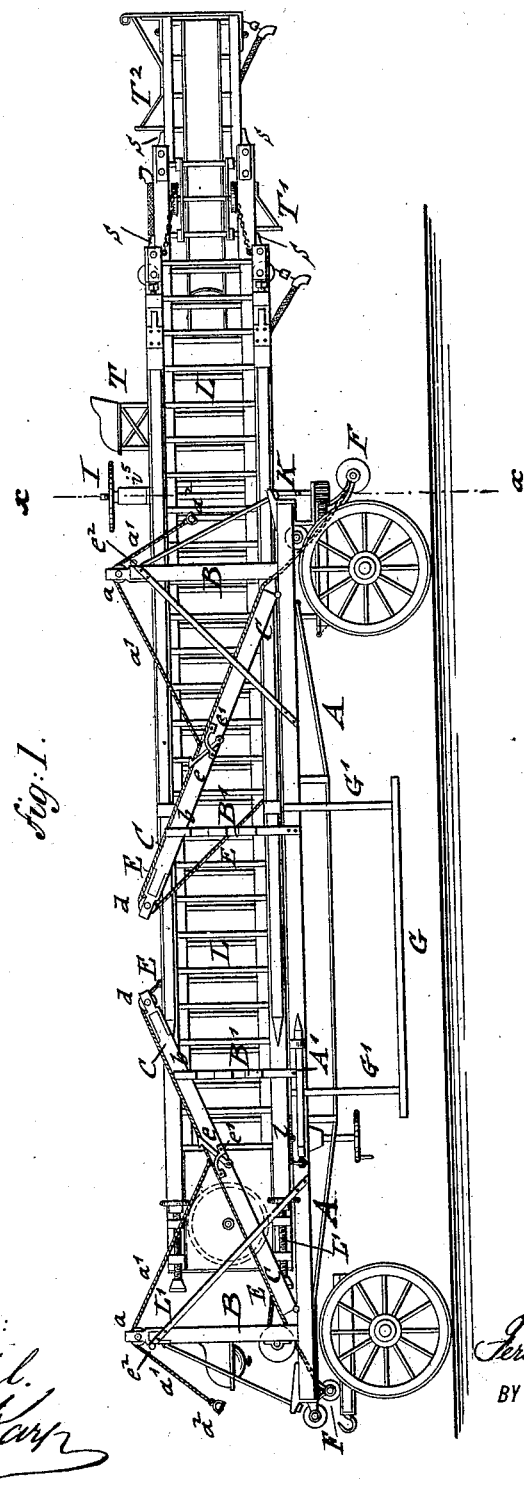
Figure 2:
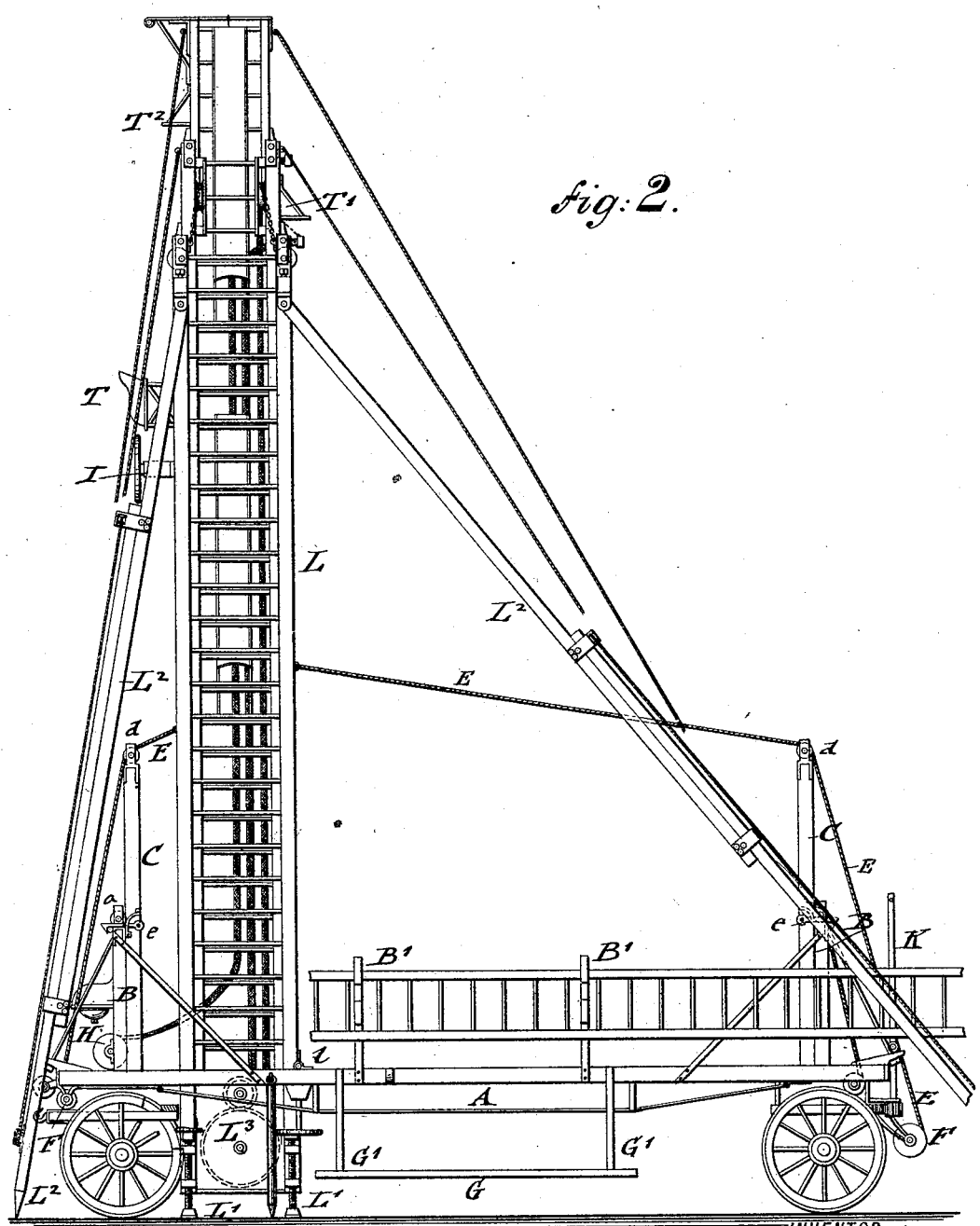

In the accompanying drawings, Figure 1 represents a side elevation of my improved telescopic ladder, shown as supported in folded state on the truck. Fig. 2 is a side elevation of the ladder, showing it in raised position and ready to be extended. Fig. 3 is a side elevation of the same, drawn on a smaller scale, and shown entirely extended. Fig. 4 is a side elevation of the telescopic ladder, drawn on a larger scale, and showing the mechanism for extending the same. Fig. 5 is a vertical transverse section on the line $x\ x$, Fig. 1, drawn on a larger scale. Figs. $5^a$ and $5^b$ are details of the tiller-shaft and its locking device. Figs. 6 and 7 are respectively a side view and an end view of the mechanism for raising and locking the main posts. Fig. 8 is a vertical section of the front part of the truck, showing the device for automatically unlocking the hose-reel. Figs. 9 and 10 are details of the telescopic ladder, showing the ice-scrapers; and Figs. 11 and 12 show my improved telescopic ladder applied, respectively, for use as an army observatory and for hoisting safes and other heavy objects.

Similar letters of reference indicate corresponding parts.

In the drawings, A represents the truck-frame, on which my improved telescopic ladder L is supported. The truck-frame A is made of any suitable construction, and supported on the fifth-wheel of the front axle and on a bolster of the hind axle, the position of which is regulated by a tiller mechanism of the usual construction.

The truck-frame A is re-enforced by a light iron truss-frame and provided near the ends with upright main posts B B, one at each side, and intermediately between the same with shorter posts or standards, B', the latter being preferably made of wrought-iron. The standards B' are provided at their upper ends with keepers $b$, for supporting the auxiliary posts C C in inclined position, said posts C C being hinged at their lower ends to the truck-frame A, close to the upright main posts B B, and provided at their upper ends with pulleys $d$. The main posts B B are also provided with pulleys $a\ a$ at their upper ends, which pulleys guide the ropes $a'$, that are attached to the auxiliary posts C C, and provided at their opposite ends with handles $a^2$, by which the ropes $a'$ can be readily taken hold of for hoisting or lowering the auxiliary posts C C.

To the hinged posts C are pivoted locking-hooks $e$, which are guided in quadrantal keepers $e'$, and adapted to be locked to pins $e^2$ of the main post B, as shown in Figs. 2, 6, and 7. The raising of the auxiliary posts C into upright position is accomplished by the ropes $a'$ without difficulty, as the intermediate standards, B', support the posts C in inclined position, from which they can be raised in a quicker and easier manner than when the hinged posts C are lowered down to the beams of the truck-frame, as in my former patent referred to.

When the hinged posts C are locked to the upright posts B of the truck-frame A, the telescopic or extension ladder L, which is supported on the truck-frame and applied to the same by the pivot-shaft I, can be readily raised from a horizontal into a vertical position by ropes E, which are attached to the main posts of the extension-ladder and passed over the pulleys $d$ at the upper end of the auxiliary posts C to the hoisting-drums F, which are located, respectively, at the front and rear trucks of the truck-frame A.

The raising of the extension-ladder L on its pivot-shaft is readily accomplished by winding the front rope E on the front drum F, and simultaneously unwinding the hind rope E from the hind drum F, until the extension-ladder arrives in a nearly-vertical position, upon which the hind rope is slowly unwound and the front rope simultaneously wound up until the ladder arrives in upright position, as shown in Fig. 2. When the extension-ladder is in upright position it is secured to the ground by means of the foot-screws L', which, like the construction of the extension-ladder and the leveling mechanism for adjusting it into vertical or inclined position, are fully described in my prior patent referred to.

To prevent the truck-frame from changing its position during the operation of raising the extension-ladder L, when the truck is on slightly-inclined ground, or when the same is pulled uphill, it is provided at both sides with swiveled truck-braces A', which are supported in keepers alongside of the beams of the truck and dropped whenever required for use. They are provided with pointed ends, so as to "bite" the ground.

A rigid tool-platform, G, is suspended, by fixed hangers G', below the truck-frame A, at the middle of the same, and provided with side steps, $G^2$, said platform G and steps $G^2$ serving to support a number of tools and implements, and also some of the attendants required for handling the extension-ladder when arriving at the place of use. Back of the driver's seat is supported, on fixed hangers of the beams of the truck-frame and the fifth-wheel of the front truck, a platform, $G^3$, (shown in Fig. 8,) on which the foreman takes his place, so as to ring the bell arranged below the driver's seat and direct from this position the different movements of the extension-ladder when raising or lowering the same.

In connection with the hinged auxiliary posts C is arranged a device for automatically unlocking the hose-reel H when lifting said posts. This unlocking device is shown in Fig. 8, and consists of a chain or rope, $r$, that is attached to the lower end of one of the auxiliary front posts C, and passed over a pulley, $r'$, of one of the front main posts B, and then downward to a check-pawl, $r^2$, that is pivoted to a bracket-plate on the front main post B. The pawl $r^2$ engages a ratchet-wheel, $r^3$, on the shaft of the hose-reel H. When the hinged post C is lifted and firmly locked to the fixed main post B, the chain or rope $r$ is stretched, so as to lift the pawl $r^2$ out of engagement with the ratchet-wheel $r^3$, and unlock thereby the hose-reel automatically, so that when the ladder L is extended the hose unwinds from the reel H without requiring the separate unlocking of the same.

The extension-ladder L is provided with four hinged and extensible braces, $L^2$, that are placed in inclined position when the ladder is in raised position, as shown in Figs 2 and 3.

When the extension-ladder has been raised, properly leveled, secured to the ground by the foot-screws L', and the extension-braces $L^2$ placed in position, a hoisting-drum, $L^3$, at the base of the extension-ladder L is operated in the usual manner. The hoisting-drum $L^3$ operates four endless hoisting-chains, $L^4$, which pass around sprocket-wheels of the drum and over suitable guide-pulleys, $m\, m$, near the same, and guide-pulleys $m'$, at the upper ends of the first ladder-section, to the lower ends of the second ladder-section, and from the same over the guide pulleys $m^2$ back to the drum. The upper ends of the first ladder-section are also connected by chains $L^5$, which pass over pulleys $m^3$ of the third ladder-section, with the lower ends of the same, as shown in Fig. 4, so that on hoisting the second section of the ladder, by turning the drum $L^3$, the third section is simultaneously raised by the chains $L^5$. As the first and second ladder-sections are connected by four endless chains with the hoisting-drum $L^3$, which latter engages the chains $L^4$ by means of the sprocket-wheels shown in dotted lines in Fig. 4, they impart thereby a positive motion to the second ladder-section, both in extending and telescoping, without relying at all on the weight of the second telescoping section in lowering the same. This is an essential feature of the present application, as thereby any danger in extending or telescoping the extension-ladder is avoided, even in case any one of the endless chains should break. The turning of the drum $L^3$ is accomplished by means of a crank-shaft and suitable gearing, in connection with the usual pawl-and-ratchet devices, brakes, &c. (Not shown in the drawings.)

By the positive motion imparted by the hoisting-gear described, any obstruction caused by the formation of ice on the side posts or rails of the upper sections of the ladder can be readily overcome. For this purpose the first and second section of the ladder L are provided with transverse scrapers $s\, s$, (shown in Figs. 9 and 10,) which scrapers remove any ice that may have been formed in cold weather on the rails of the second and third sections when lowering the same after use.

To the main section of the ladder is attached a seat, T, for the tiller-man, which seat is arranged back of the tiller-wheel I. To the second and third ladder-sections are attached firemen's platforms T' $T^2$, which serve as stops when the ladder is telescoped, so as to protect the hoisting-gear from being injured by contact with the lower ends of the telescoping ladder-sections.

The tiller-wheel I is keyed to a tiller-key, K, which is made of two sections—a lower section, $K^2$, which is supported in a bracket-bearing, $K^4$, of the truck-frame A, and provided with a pinion, $K^3$, and an upper longer section, K', which is pivoted to the lower section, $K^2$, and connected to the tiller-wheel T, as shown in Fig. 5. The upper section, K', of the tiller-key K is passed through slots $i$ in the side posts of the third or upper ladder-section, and fitted by its square upper end into a square recess in the hub of the tiller-wheel, which is connected to the upper end of the tiller-key K by a spring-key, $i'$, and chain or rope $i^2$, as shown in Figs. 5 and 5ª. The hub of the tiller-wheel I is connected by bolts to a flanged collar, $i^3$, which is fitted to a ring-shaped rail, $i^4$, of the supporting-frame $i^5$ of the tiller-wheel I. When the extension-ladder L is to be raised, the spring-key $i'$ is detached from the tiller-key, so that the latter is automatically disconnected from the tiller-wheel by the raising of the ladder. When the extension-ladder is lowered down to the truck-frame A, all that is required is to guide the tiller-key through the slots $i$ of the third or upper section of the ladder, and through the collar $i^3$ into the hub of the tiller-wheel I, after which the spring-key is replaced, and thereby the tiller-wheel locked in reliable manner to the tiller-key, without the use of any detachable parts that are liable to get lost in operating the ladder. The oscillating motion of the tiller-key K, when detached from the tiller-wheel, is confined in one direction by a stop device formed by the eccentric lower end of the upper section, K', (shown in Fig. 5ᵇ,) so that the tiller-key cannot drop and injure any one of the attendants when the ladder is raised.

The extension-ladder L is provided with the usual accessories—such as hinged bridges, guy-ropes, water-hose, hose-couplings, and nozzles—as is more fully described in the before-mentioned Letters Patent No. 232,968, while the specific construction of the extension-ladder is fully described in the Patent No. 244,059, dated July 12, 1881, to which reference is made.

Though the operation of my telescopic ladder has been described to some extent in connection with the different parts, I will briefly recapitulate the main steps of the same. The first step consists in raising the inclined posts C into upright position by the hand-ropes $a\,a$, and locking them to the fixed main posts B. Simultaneously therewith the hose-reel is unlocked. The extension-ladder L is then raised into upright position by the ropes E and winding-drums of the front and rear trucks. Before raising the ladder the tiller-man has to release the tiller-wheel by withdrawing the spring-key from the tiller-key. The ladder is next adjusted into vertical or inclined position, as required, and secured to the ground by the foot-screws at the base of the same. The ladder is then extended by means of the endless chains and hoisting-gear, and supported in position by the inclined extension-braces of the same and suitable guy-ropes. The hose are lifted simultaneously with the extending of the ladder, so as to be ready for use. The firemen then mount the extension-ladder and take up their positions on the platforms of the ladder-sections, so as to direct the water in any desired direction for effectively reaching the source of fire, or getting to the upper floors of high buildings by means of the drop-bridges. When the telescopic ladder is used as a portable observatory, a platform is arranged at the upper end of the third ladder-section, as shown in Fig. 11, while when the ladder is used for hoisting safes and other heavy objects the extension-ladder is provided with a truss-beam at the upper end and with brace-beams in place of the drop-bridges, as shown in Fig. 12.

Having thus described my invention, I claim as new and desire to secure by Letters Patent—

1. The combination of a truck-frame having fixed main posts with auxiliary posts hinged to the truck-frame and intermediate posts provided with keepers at the upper ends for supporting the hinged posts in inclined position, substantially as set forth.

2. The combination, with a truck-frame having fixed main posts near its ends and shorter intermediate posts having keepers at the upper ends, of hinged auxiliary posts supported in inclined position on the intermediate posts and locking devices by which the hinged posts are locked to the upright main posts, substantially as set forth.

3. The combination, with the truck-frame having fixed main posts and hinged auxiliary posts, of a device for automatically unlocking the hose-reel when raising the hinged front posts, substantially as set forth.

4. The combination, with a truck-frame, of a telescopic ladder supported on the same, a tiller-wheel supported on a guide-frame of the ladder, a tiller-key made in two sections, a lower section and an upper section pivoted to the lower section, and a locking device for attaching or detaching the tiller-key to or from the tiller-wheel, substantially as set forth.

5. The combination, with a truck-frame, of a telescopic ladder supported on the same, the uppermost ladder-section of which is provided with slots above the tiller mechanism, a tiller-key formed in two sections, of which the upper section passes through the slots in the ladder-section, a tiller-wheel, a guide-frame for said tiller-wheel, and a spring-key for holding the tiller-key to the hub of the tiller-wheel, substantially as set forth.

6. The combination of a truck-frame, an extension-ladder pivoted thereto, a hoisting-gear composed of a drum having sprocket-wheels, endless chains that are passed around said sprocket-wheels and connected with the first and second sections of the ladder, guide-pulleys for said endless chains, chains connecting the first and third ladder-sections, and pulleys for guiding said chains, substantially as set forth.

7. The combination, with a truck-frame, of an extension-ladder pivoted to said truck-frame, a hoisting-gear for extending the ladder-sections, and chains connecting the first, second, and third sections of the ladder, the second and third ladder-sections being provided with firemen's platforms that act as stops for the ladder-sections when telescoping the same, substantially as set forth.

8. An extension-ladder the lower sections of which are provided with transverse scrapers at the upper ends for removing the ice when telescoping the ladder-sections, substantially as set forth.

In testimony that I claim the foregoing as my invention I have signed my name in presence of two subscribing witnesses.

FERDINAND W. HOFELE.

Witnesses:
PAUL GOEPEL,
MARTIN PETRY.